Dec. 11, 1962  J. K. DEW  3,067,971
SUPER DRAG FLAP

Filed Oct. 1, 1959  2 Sheets-Sheet 1

INVENTOR.
JOSEPH K. DEW

BY Thomas S. MacDonald
ATTORNEY

Dec. 11, 1962    J. K. DEW    3,067,971
SUPER DRAG FLAP
Filed Oct. 1, 1959    2 Sheets-Sheet 2

INVENTOR.
JOSEPH K. DEW

BY Thomas S. MacDonald

ATTORNEY

United States Patent Office 3,067,971
Patented Dec. 11, 1962

3,067,971
SUPER DRAG FLAP
Joseph K. Dew, La Habra, Calif., assignor to North American Aviation, Inc.
Filed Oct. 1, 1959, Ser. No. 843,691
11 Claims. (Cl. 244—113)

This invention relates to a drag device for airborne vehicles and more particularly to a super drag flap for compressing a supersonic airstream and subsequently changing the compressed stream into a subsonic stream so as to produce high drag characteristics on the airborne vehicle.

The inevitable trend of aircraft and missiles to higher and higher speeds has resulted in a demand for highly efficient drag devices which will decelerate these airborne vehicles for re-entry into an aerodynamic environment and also provide for general maneuverability of the vehicle. Furthermore, since the peak temperature, deceleration, and dynamic pressures are inverse functions of the integrated drag, large reductions of these parameters can greatly simplify structural design of the vehicle so as to reduce the size and weight thereof.

The prior art suggests conventional flaps, parachutes, or skirt type drag devices for use at subsonic and low supersonic speeds, however; the impracticality of such devices to hypersonic speed conditions is apparent to those skilled in the supersonic aircraft and missile art.

The present invention overcomes the inadequacies of the prior art by providing a super drag flap capable of use at high Mach numbers. In the relatively new space age supersonic type airborne vehicles, wherein the vehicle must substantially decrease in speed and ofttimes change direction before entering an aerodynamic environment, the present invention finds indispensable utility.

The principal object of this invention is to provide a super drag flap adapted to produce high drag characteristics on an airborne vehicle so as to decelerate the vehicle as well as provide for the general maneuverability thereof.

Another object of this invention is to provide a super drag flap composed of a forebody adapted to isentropically compress an air stream and an aft flap adapted to change the compressed supersonic airstream into a subsonic airstream having a near zero velocity.

Still another object of this invention is to provide an aft-flap which can be selectably positioned from the operative to inoperative position by remote control means.

Still another object of this invention is to provide a super drag device with a number of mechanical variables, various combinations of which will produce an infinite number of drag characteristics.

Other objects and features of this invention will become apparent from the following specifications when read in connection with the accompanying drawings wherein.

Figure 1:
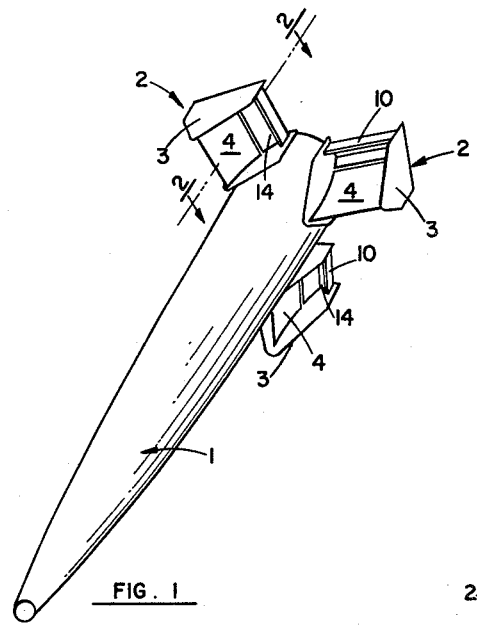
FIG. 1 shows a typical installation of a preferred embodiment of the super drag device on a missile.

A typical installation of the super drag flap is shown in FIG. 1 wherein missile 1 has the super drag flap 2 mounted on the aft end thereof.

FIG. 1 discloses three equally spaced super drag flaps, however; it is to be understood that any number may be employed depending on the desired operational requirements of the missile. In the preferred embodiment, a V-shaped forebody 4 is mounted between two reflection plates 3, perpendicular to the longitudinal axis of the missile. The reflection plates 3 have a multi-purpose application. For example, the inner plate serves as a boundary to contain the relatively high pressure on the super drag flap to thus prevent a high strength shock resulting in high temperature conditions from injuring the missile body while the outer plate, in conjunction with the inner plate, serves to contain the high pressure airstream thus increasing the stability of the missile.

Figure 3:
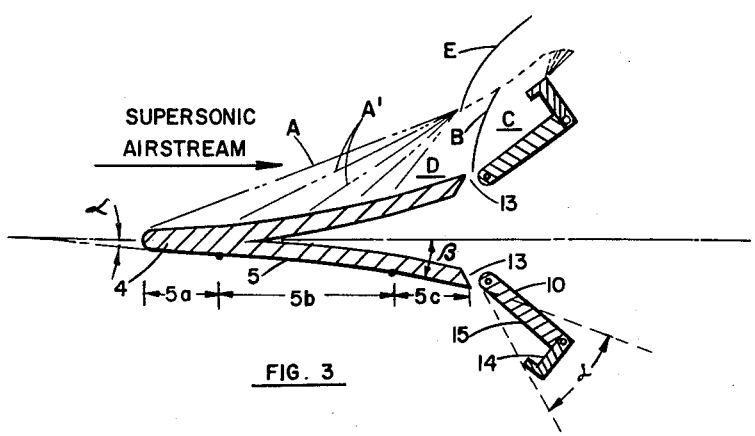
FIG. 3 shows a cross section similar to FIG. 2, but further shows the distribution of the supersonic aerodynamic environment as it would appear during supersonic flight conditions.

Referring now to FIG. 3, a surface 5 of the forebody 4 is divided into three segments, 5a, 5b and 5c. The three segment portions of the forebody surface cooperate so as to substantially compress the supersonic airstream with a minimum of total pressure loss. Other surface shapes and combinations of geometric designs may be employed depending on the specific supersonic airstream compression requirements of the particular aircraft.

Figure 2:
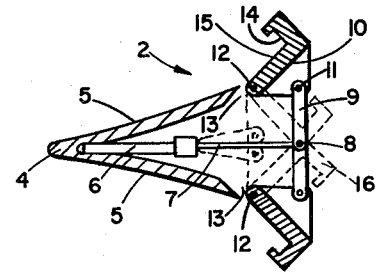
FIG. 2 shows a cross section 2—2 of the super drag flap as taken in FIG. 1.

In FIG. 2 the apex of the forebody faces the fore end of the missile and a power means 6 having a power shaft 7 is attached thereto. This power shaft 7 is adapted to be longitudinally actuated by the power means to move the super drag flap 10 into operative position. The power means may be formed of any convenient type, for example, a solenoid acting to longitudinally actuate the shaft 7. The power means may be constructed for response to a remote control device if desired.

A pivot pin 8 on the end of the power shaft 7 pivotally connects two lock links 9, shown in extended open position in full lines in FIG. 2. An aft flap 10, acting as a bell crank, is connected to the link 9 by pivot pin 11 at a first corner thereof. A pivot shaft 12 is mounted on the missile between the two platforms 3 and pivotally mounts a second corner of the aft flap 10 adjacent the forebody 4. The trailing edge of the V-shaped forebody 4 and the second pivoted corner of the aft flap 10 are spaced to form a boundary layer bleed opening 13. The leading surface 15 of the aft flap has a cup member 14 perpendicularly mounted thereon.

OPERATION

From the above described arrangement of the super drag flap it is obvious that upon actuation of the power means 6, the aft flap 10 will be pivoted on shaft 12 from the dotted inoperative position 16 (FIG. 2) to the desired operational angle γ (FIG. 3).

When the super drag flap is employed on a missile, adapted to travel in outer space, the aft flap could be remotely controlled to the tucked or inoperative position 16. However, when the missile enters an aerodynamic environment, a decrease in missile speed is necessitated since large missile temperature and stress rises are undesirable. Accordingly, the remotely controlled power means 6 is actuated and the aft flap is pivoted to an operative position.

FIG. 3, illustrating a forebody design adapted to render one specific drag characteristic, shows a supersonic airstream being turned and isentropically compressed at $A^1$, by the forebody surface segments 5a and 5b. The first straight segment 5a of forebody surface 5 forms an initial angle α with the longitudinal axis of the forebody. In the illustrated embodiment 5a is normally a flat surface segment and functions to focus the leading edge or primary shock wave A and the secondary shock wave $A^1$ generated by the isentropic surface 5b at a specific design Mach number.

Theoretically, for the highest possible performance (lowest initial total pressure loss), the initial angle would be zero with an infinite sharpness. However, for practical application a compromise structurally strengthened design compensating for high temperatures (under supersonic flight conditions) on the forebody edge has been shown.

Curved surface segment 5b is of the reversed Prandt-Meyer type which functions to form a boundary such that all of the shock waves $A^1$ attempt to focus as shown in FIG. 3, at a given design Mach number. The surface 5 termintes in a second substantially straight segment 5c, which forms a final angle $\beta$ with the forebody axis. Segment 5c is necessary so that the strong shock wave B does not intersect the shock waves $A^1$ generated by portion 5b.

It is to be understood that the super drag flap may be designed with a two dimensional compression type arrangement, as shown, an axisymmetrical compression type arrangement or combinations thereof.

Figure 5:
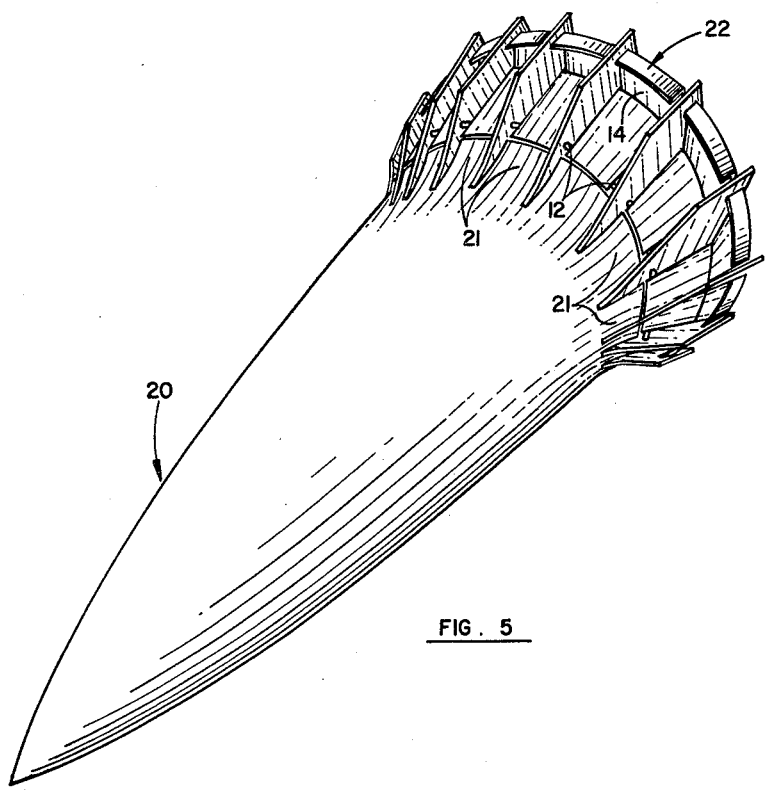
FIG. 5 is a modification of the super drag flap as applied to a typical missile nose cone.

FIG. 5 shows a practical application of a two dimensional and axisymmetrical super drag flap arrangement wherein a missile nose cone 20 has an axisymmetrical forebody compression surface 21 formed integral therewith. The aft flaps 22, similar in construction to the pivoted aft flap 10 of FIG. 1, are radially spaced so as to produce drag characteristics in much the same manner as aft flap 10.

During supersonic flight of the missile the leading surface 15 of the aft flap 10 and the cup member 14 cooperate to produce the desired drag characteristics. The supersonic airstream is subjected to a relatively weak shock A (associated compression) followed by isentropic compression $A^1$ to a low supersonic flow field D. The cup member 14 produces a relatively strong shock system B presenting an obstacle of such magnitude as to shock the low supersonic flow field D into a subsonic airstream C followed by subsonic compression to near zero velocity.

The resulting subsonic airstream, by nature of the high pressure rise through the shock system, impinges on the aft flap to produce high surface pressures and consequently high drag characteristics. The boundary layer bleed opening 13 functions to hold the shock system B in a relatively stable position.

Since the extremely high pressures in the subsonic portion of the flow field becomes higher as the airstream Mach number increases, it is theoretically possible to design a super drag flap which will have peak drag coefficients in the hypersonic range many times greater than the same size plain or conventional flap. The extremely high drag coefficient per unit projected area are far greater than the best parachute, plain flap, shirts or other conventional drag devices of the high total pressure loss type.

It is to be understood that the hereinabove described super drag flap arrangement is one specific embodiment of the invention. Various combinations of rotational and translatory changes of the individual components of the super drag flap may be designed as a variable geometry version for a specific application.

For example, various changes in (1) initial angle (constructed so that the total pressure head loss is generally less than 10%; at Mach 10, $\alpha$=approximately 4°), (2) final angle $\beta$ (should not be constructed greater than to produce Mach 1.1 in area D, at the lowest Mach number for which the highest drag characteristics are required, and be such that shock E will not advance and interfere with compressed flow A'; at Mach 3, $\beta$=approximately 34°), (3) boundary layer bleed opening 13 (shall be of a sufficient width to bleed the 0–1.33 Mach number portions of boundary layer), (4) aft flap angle $\gamma$ (determined by the cup height and location; when the Mach number is 1.2 at area D, $\gamma$=4°; at Mach=1.6 in area D, $\gamma$=15°), (5) the height of cup member 14 (angle $\gamma$ determines the cup height and length and should be such that the shock B does not interfere with compressed shocks A') and (6) the relative positioning of the cup member 14 on aft flap surface 15, will produce the desired drag characteristics for any specific operating condition.

Therefore, to construct the above variables so that they may be remotely controlled and selectively changed at the will of the operator, during the missile flight, would provide for an infinite number of drag characteristics.

Figure 4:
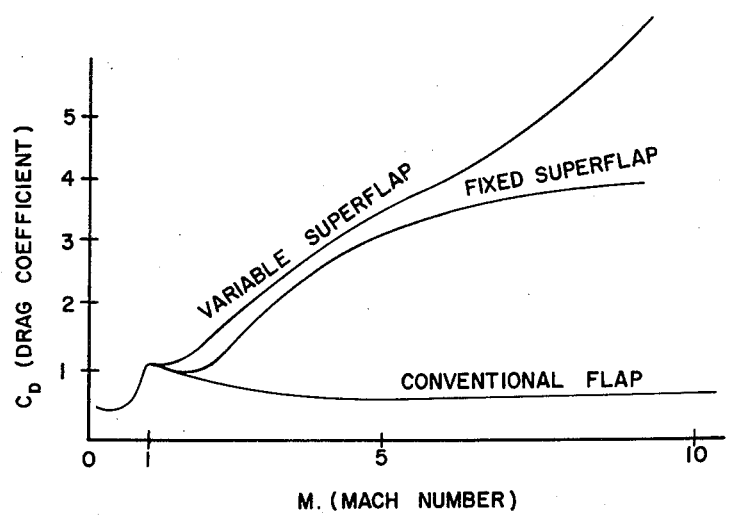
FIG. 4 shows a graphical comparison of the drag characteristics of the conventional type flap and the super drag flap of this invention.

To more clearly illustrate the inventive concept included herein, FIG. 4 discloses an approximate graphical comparison of the operational drag characteristics of three types of drag flaps wherein the drag coefficient ($C_D$) is plotted against the mach numbers and wherein:

$$C_D \text{ (coefficient of drag)} = \frac{D}{qs}$$

$D$ = drag, lb.

$q$ = dynamic pressure, $\frac{lb.}{ft.^2}$ $S$ = reference area, $ft.^2$ $M$ (Mach number) = $V/V_s$ $V$ = speed of the fluid, FPS $V_s$ = speed of sound in the fluid, FPS The three curves comprise: the super drag flaps ultimate operational drag characteristics as they would appear upon selective changing of the aforementioned six variables during a specific flight of the airborne vehicle (Variable Superflap); the operational drag characteristics of the super drag flap when the six variables are held constant (Fixed Super Flap) and; conventional parachute, flaps, skirt or drag brake operationl drag characteristics (Conventional Flap).

Upon comparing the three curves, it can readily be seen that the variable and fixed superflaps produce high supersonic drag charcteristics unattainable with the conventional type of drag flap. It is to be noted that any point in the area between the variable super flap and fixed super flap curves is attainable depending on a particular flight pattern. That is to say it may be desirable to intermittently slow down, speed up, or change directions of the airborne vehicle thus creating a specific drag characteristic curve for a particular flight pattern.

Although certain embodiments of the invention have been set forth, it will become apparent that various changes and modifications may be made in the construction and arrangement of the various parts without departing from the scope of this novel concept.

I claim:

1. A super drag flap for use in a supersonic aerodynamic environment comprising: a forebody means to compress a supersonic aerodynamic environment; an aft flap means to shock the compressed supersonic aerodynamic environment formed by said forebody means to a subsonic aerodynamic environment to thereby produce high drag characteristics on said drag flap, said aft flap means comprising an aft flap member having a leading surface thereon adapted to be pivotally mounted adjacent said forebody means and a cup means mounted on the leading surface facing said forebody means.

2. The super drag flap of claim 1 wherein a power means is mounted on the forebody means and is operatively attached to the aft flap member and adapted to pivotally actuate said aft flap member.

3. An airborne vehicle adapted to travel through an aerodynamic environment at relative supersonic velocity having a fore and aft end, said aft end having a super drag flap mounted thereon; said super drag flap comprising: a forebody means fixedly attached to the vehicle for compressing the aerodynamic environment; aft flap means mounted on the missile aft end aft of the forebody means to produce a shock so as to change the compressed aerodynamic environment to a subsonic air stream and thereby produce high drag chracteristics on the vehicle, said aft flap means comprising an aft flap member pivotally mounted to said vehicle having cup means mounted thereon facing the fore end of the vehicle.

4. The airborne vehicle of claim 3 wherein a power means is mounted on the forebody means and is operatively attached to the aft flap member so as to pivotally actuate said aft flap member.

5. An airborne vehicle adapted to travel through an aerodynamic environment at relative supersonic velocity having a fore and aft end, said aft end having a super drag flap mounted thereon; said super drag flap comprising: a forebody means fixedly attached to the vehicle for compressing the areodynamic environment; aft flap means mounted on the missile aft end aft of the forebody means to produce a shock so as to change the compressed aerodynamic environment to a subsonic air stream and thereby produce high drag characteristics on the vehicle, the said aft flap means being spaced from said forebody means to provide a boundary layer bleed opening for stabilizing the shock produced by said aft flap means.

6. An airborne vehicle adapted to travel through an aerodynamic environment at relative supersonic velocity having a fore and aft end, said aft end having a super drag flap mounted thereon; said super drag flap comprising: a forebody means fixedly attached to the vehicle for compressing the aerodynamic environment; aft flap means mounted on the missile aft end aft of the forebody means to produce a shock so as to change the comprssed aerodynamic environment to a subsonic air stream and thereby produce high drag characteristics on the vehicle, the said forebody means comprising a first flat surface means adapted to form a primary shock wave during relative supersonic velocities of the aerodynamic environment; a curved surface means continuing from said first flat surface and adapted to isentropically generate secondary shock waves; a second flat surface means continuing from said curved surface means adapted to assure non-interference of the shock produced by the aft flap means with the secondary shock waves generated by said curved surface means.

7. In an airborne vehicle adapted to travel through an aerodynamic environment at relative supersonic velocity, a super drag flap comprising: a forebody having surface means for isentropically compressing a relative supersonic aerodynamic environment; an aft flap pivotally mounted adjacent and spaced from said forebody so as to provide a boundary layer bleed opening; a shock means mounted on said aft flap for shocking the compressed relative supersonic areodynamic environment to a subsonic aerodynamic environment so as to produce high drag characteristics on said aft flap.

8. The super drag flap of claim 7 further comprising: a power means attached to said forebody; a power shaft extending from said power means and attached to said aft flap by a pivot means, said power means adapted to pivot said aft flap from operative to inoperative position.

9. An airborne vehicle adapted to travel through an aerodynamic environment at relative supersonic velocity having a fore and aft end with a super drag flap attached to the aft end thereof, said super drag flap comprising: a forebody, V-shaped in cross-section attached to said missile and having outer reversed Prandtl-Meyer type surfaces adapted to isentropically compress a supersonic aerodynamic environment, the apex of the V-shaped forebody facing the fore end of the missile; a power means attached to the apex of the V-shaped forebody; a power shaft operatively connected to the power means and adapted to be longitudinally actuated thereby; a first pivot pin on the end of said shaft pivotally connecting two lock links at a first end thereof; an aft flap comprising: a first corner and second and third corners; a second pivot pin pivotally connecting the second end of the two lock-links adjacent said first corner of said aft flap; a pivot shaft mounted on said missile adjacent said forebody pivotally mounting the second corner of said aft flap, said corner being spaced from said forebody to form a boundary layer bleed opening adjacent the point at which the supersonic aerodynamic environment is compressed; cup means on the third corner of said aft flap facing the apex of said forebody, said aft flap and cup means adapted to present an obstacle of such magnitude to the supersonic aerodynamic environment so as to produce a shock system which is held in a stable position by said boundary layer bleed opening and changes the compressed supersonic aerodynamic environment originating at the forebody into a subsonic aerodynamic environment.

10. A super drag flap adapted to produce predetermined drag characteristics in a relative supersonic aerodynamic environment comprising two relatively spaced plates; a V-shaped forebody connecting said plates and having surface means adapted to isentropically compress a relative supersonic aerodynamic environment; an aft flap means pivotally mounted between said plates and spaced from said forebody so as to provide a bleed opening therebetween; said aft flap means adapted to change the isentropically compressed relative supersonic aerodynamic environment into a subsonic aerodynamic environment and thus create large drag characteristics on said aft flap means.

11. The super drag flap of claim 10 wherein the aft flap means includes a cup means facing said forebody means.

References Cited in the file of this patent

UNITED STATES PATENTS

| 2,398,710 | King | Apr. 16, 1946 |
| 2,916,230 | Nial | Dec. 8, 1959 |
| 2,918,229 | Lippisch | Dec. 22, 1959 |

FOREIGN PATENTS

| 69,844 | France | Sept. 29, 1958 |

OTHER REFERENCES

Flight Magazine, pages 731–732, May 30, 1958.